United States Patent
Bi et al.

(10) Patent No.: US 8,098,613 B2
(45) Date of Patent: Jan. 17, 2012

(54) METHOD OF MANAGING TRANSMISSION DELAY IN A WIRELESS COMMUNICATION SYSTEM

(75) Inventors: Qi Bi, Morris Plains, NJ (US); Pi-Chun Chen, Lake Hiawatha, NJ (US); Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1106 days.

(21) Appl. No.: 11/318,483

(22) Filed: Dec. 28, 2005

(65) Prior Publication Data

US 2007/0147331 A1 Jun. 28, 2007

(51) Int. Cl.
*H04B 7/185* (2006.01)

(52) U.S. Cl. ..... 370/318; 370/332; 370/333; 455/452.2; 455/522; 455/69

(58) Field of Classification Search ....... 370/310.2–328; 455/500–506, 8–13.4
See application file for complete search history.

(56) References Cited

U.S. PATENT DOCUMENTS

| | | | |
|---|---|---|---|
| 5,487,068 A | 1/1996 | Smolinski et al. | |
| 5,710,981 A * | 1/1998 | Kim et al. | 455/69 |
| 5,828,677 A | 10/1998 | Sayeed et al. | |
| 6,011,973 A * | 1/2000 | Valentine et al. | 455/456.6 |
| 6,625,133 B1 | 9/2003 | Balachandran et al. | |
| 6,662,019 B2 | 12/2003 | Kamel et al. | |
| 6,842,441 B2 | 1/2005 | Balogh et al. | |
| 6,859,446 B1 | 2/2005 | Gopalakrishnan et al. | |
| 6,925,057 B2 | 8/2005 | Cheng et al. | |
| 6,944,449 B1 | 9/2005 | Gandhi et al. | |
| 6,968,201 B1 | 11/2005 | Gandhi et al. | |
| 6,975,611 B1 | 12/2005 | Balachandran et al. | |
| 7,136,665 B2 * | 11/2006 | Ida et al. | 455/522 |
| 7,852,823 B2 * | 12/2010 | Nakashima et al. | 370/348 |
| 2003/0223429 A1 | 12/2003 | Bi et al. | |
| 2004/0015308 A1 * | 1/2004 | Lee et al. | 702/75 |
| 2004/0174846 A1 * | 9/2004 | Kwon et al. | 370/328 |
| 2004/0179493 A1 | 9/2004 | Khan | |
| 2004/0203822 A1 | 10/2004 | Vitebsky | |
| 2004/0205105 A1 * | 10/2004 | Larsson et al. | 709/200 |
| 2005/0058154 A1 * | 3/2005 | Lee et al. | 370/473 |
| 2005/0105494 A1 * | 5/2005 | Kim et al. | 370/335 |
| 2005/0135282 A1 * | 6/2005 | Miyoshi et al. | 370/278 |
| 2005/0227721 A1 * | 10/2005 | Nakao | 455/510 |
| 2005/0243855 A1 * | 11/2005 | Dominique et al. | 370/441 |
| 2006/0114936 A1 * | 6/2006 | Paffen | 370/469 |
| 2006/0133268 A1 * | 6/2006 | Wu et al. | 370/328 |
| 2006/0252445 A1 * | 11/2006 | Kim et al. | 455/522 |

OTHER PUBLICATIONS

Zhou et al., Optimum Sub-Packet Transmission for Turbo-Coded Hybrid ARQ Systems, 2003, IEEE pp. 3080-3084.
Wen et al., Channel Adaptive Hybrid ARQ/FEC for Robust Video Transmission Over 3G, 2005, IEEE, pp. 1-5.
Rao et al., Resource Allocation and Fairness for Downlink Shared Data Channels, 2003, IEEE, pp. 1049-1054.

* cited by examiner

*Primary Examiner* — Dai A Phuong
(74) *Attorney, Agent, or Firm* — Harness, Dickey & Pierce

(57) ABSTRACT

In one embodiment of a method of managing transmission delay in a wireless communication system, a length of time over which a mobile station is permitted to re-transmit a packet or portion of a packet over a channel is controlled such that the length of time depends on at least one of a position of the mobile station, a temporal fading characteristic of the mobile station, and a radio frequency characteristic of the channel.

19 Claims, 4 Drawing Sheets

METHOD OF MANAGING TRANSMISSION DELAY IN A WIRELESS COMMUNICATION SYSTEM

BACKGROUND OF THE INVENTION

1. Field of the Invention

The present invention relates generally to managing transmissions in communication systems.

2. Description of Related Art

New technical challenges emerge as telecommunication systems evolve from a second generation system offering pure voice services to a third generation system providing mixed voice and data services. In meeting data service demands, new performance metrics and algorithms need to be defined in order to optimize data performance.

The CDMA 3G-1x Evolution Data Only system (1x-EV-DO, also known as a High Rate Packet Data (HRPD) system) is an evolution system of cdma2000 3G-1x, and is a pure data system to provide data services to mobile users. In 1x-EV-DO, a scheduler or scheduling function is provided in a base station controller in order to provide fast scheduling or management of system resources based on channel quality feedback from one or more mobiles. In general, a scheduler selects a mobile for transmission at a given time instant, and adaptive modulation and coding allows selection of the appropriate transport format (modulation and coding) for the current channel conditions seen by the mobile.

In second generation wireless communications systems such as those of the IS-95 standard, applications typically employ voice-based communication schemes, in which a connection between the base station and the mobile is a dedicated connection. Since these are essentially fixed connections, there is no need for prioritizing the order of transmission to the active users served by the system (an active user is a user with data to transmit at a current time instant). However, with the emergence of third generation wireless data communications systems, such as CDMA-2000 standard systems and 1x-EV-DO, management of system resources is of greater importance. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller. In a conventional prioritization scheme, idle mobile's are assigned a lower priority than a mobile with data to transmit. On the reverse link, all mobiles are transmitting their traffic concurrently. The transmission data rates are determined by mobiles autonomously through media access control algorithms. Different applications are assigned different priorities within a mobile.

Accordingly, the forward link scheduler should be able to manage these large numbers of users and the reverse link rate control should be properly configured without wasting radio resources of the communication system. This management function becomes even more important as both base station and mobiles attempt to meet QoS (Quality of Service) requirements. QoS is a general term that may represent a number of different requirements. As a basic tenant, QoS is indicative of providing guaranteed performance (e.g., such as a minimum/maximum data throughput, a minimum delay requirement, a packet loss rate, and a packet download time, etc.) in a wireless communication system.

Quality of Service (QoS) differentiation in wireless data networks allows network operators to generate more revenue than is possible with best-effort scheduling policies. The promise of additional revenue is based on the willingness of end users (mobile subscribers) to pay more for perceptible improvements in service (e.g., lower latency, higher throughput, or more predictable performance). QoS differentiation also enables deployment of new services (e.g., streaming audio/video, packet voice etc.).

SUMMARY OF THE INVENTION

The present invention relates to managing resources and in particular to managing transmission delay in a wireless communication system.

In one embodiment of a method of managing transmission delay in a wireless communication system, a length of time over which a mobile station is permitted to re-transmit a packet or portion of a packet over a channel is controlled such that the length of time depends on at least one of a position of the mobile station, a temporal fading characteristic of the mobile station, and a radio frequency characteristic of the channel. For example, the controlling step may control an expected number of sub-packet transmissions associated with a packet before receipt of the packet is acknowledged. This termination target may be controlled by controlling powers of the sub-packet transmissions.

In one embodiment, the controlling step controls the transmission powers of the sub-packets based on a distance the mobile station is from a base station handling communication for the mobile station. For example, at least one of the transmission powers may be reduced as the distance increases beyond a threshold distance.

In another embodiment, at least one of the transmission powers for the sub-packets may be reduced if the mobile station is experiencing fading greater than a threshold amount. Here, an average transmission power headroom for transmission on the channel may be determined as being indicative of the temporal fading characteristic, and at least one of the transmission powers may be reduced if the determined average transmission power headroom falls below a threshold value.

In a further embodiment, at least one of the transmission powers is controlled based on a Doppler frequency of the channel. For example, a Doppler frequency of a pilot signal received from a base station may be determined and used as the Doppler frequency of the channel. The RF channel characteristic of the channel may be then indicated by the Doppler frequency.

In another embodiment of the present invention, the method of managing transmission delay in a wireless communication system, includes determining a distance of a mobile station from a base station and selecting a first termination target based on the determined distance. The termination target is a desired number of sub-packet transmissions associated with the transmission of a packet before receipt of the packet is acknowledged. An average transmission power headroom for transmissions on a channel is also determined, and a second termination target is selected based on the determined average transmission power headroom. One of the first and second termination targets may be selected as a third termination target. Further, a radio frequency, RF, characteristic of the channel is determined. Then, the powers with which sub-packets associated with a packet are transmitted on the channel are controlled based on the determined RF characteristic and the selected third termination target to manage the transmission delay.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
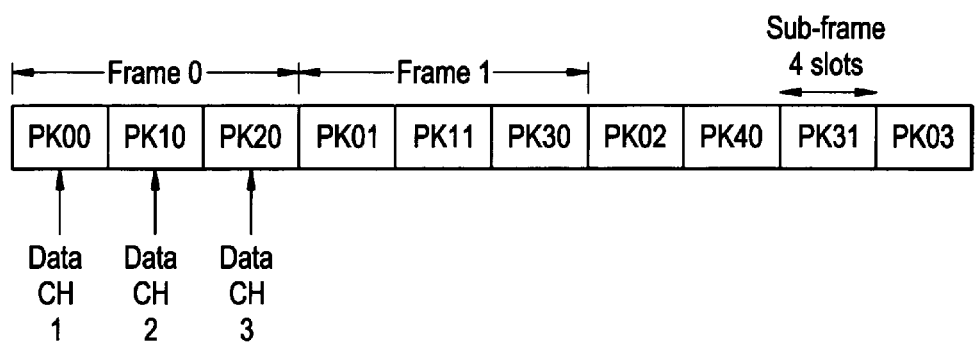
FIG. 1 illustrates an example of the traffic channel in 1xEV-DO.

To meet the rapidly developing needs associated with wireless applications such as wireless internet applications, for example, 3G systems utilize performance enhancing technologies such as Fast Scheduling, Adaptive Modulation and Coding (AMC) and/or Hybrid Automated Repeat Request (HARQ). Fast Scheduling is a channel quality sensitive scheduling technique to maximize sector throughput, e.g., a base station assigns resources to one or more users at a given time based on channel quality. AMC technologies enable a selection of a data rate and a transmission format (i.e., modulation level and channel coding rate) that best "suits" the scheduled user's prevailing channel condition.

Delays and measurement errors may result in degraded performance from AMC. For example, suppose a block of bits or a packet was sent out using QPSK modulation and a code rate of 0.5 and was received erroneously. A retransmission of that packet takes place, in general with a new appropriate choice of modulation and in general, with at least a few new "parity" bits from the original set of coded bits. HARQ technologies may thus be used to provide some level of robustness through fast retransmissions at the physical layer, in an attempt to minimize degradation.

HARQ allows combining of the original transmission with the new transmission, rather than to discard the original transmission. This may improve the probability of correct decoding of the packet. The word "hybrid" in HARQ indicates that Forward Error Correction (FEC) techniques are used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted.

Further evolution of 3G standards include high-speed reverse link packet access (mobile station to base station). While much of the standardization to date has focused on the forward link, enhancements are now being considered for the reverse link. The enabling technologies discussed above may also be used on the reverse link to improve the data rates and system capacity, for example.

In the reverse link of a 1xEV-DO system, there are a total of 6 channels per user: one traffic channel and five over-head channels. The five over-head channels include a pilot channel, a data resource control (DSC) channel, a data source control (DSC) channel, an acknowledgement (ACK) channel, and a reverse rate indication (RRI) channel. The pilot channel is used for channel estimation of the air interface between the base station and the mobile station, and is used for power control purposes. Power control makes sure that the received pilot channel power at the base station is stable and results in a stable channel estimation. Accordingly, transmission power of the other channels are defined by channel gains with respect to the pilot channel. For the traffic channel, the transmit power is specified by a power gain called the traffic-to-pilot (T2P) power gain.

FIG. 1 illustrates an example of the traffic channel. As shown, the traffic channel has an interlaced structure in which three data channels are interlaced to form one frame. The frame includes three sub-frames. Each sub-frame includes one data channel, and is comprised of four slots (~6.67 ms) in duration. FIG. 1 further illustrates the application of HARQ to the traffic channel. In 1xEV-DO, according to HARQ, a packet for transmission is broken into 4 sub-packets. The sub-packets are transmitted in successive instances of one of the data channels until an acknowledgement is received that the packet has been successfully received by the base station. For example, on the base station side, the packet is decoded by combining the information from the sub-packets received so far. If the decoding is successful, the base station sends an acknowledgement to the mobile station. The mobile station may then use the data channel for transmitting the sub-packets of a new packet.

FIG. 1 illustrates that a first packet P0 is broken into four sub-packets P01, P02, P03 and P04. The mobile station transmits the first sub-packet P01 on the first data channel of the first frame, transmits the second sub-packet P02 on the first data channel of the second frame, etc. until all sub-packets have been transmitted. FIG. 1 shows that a second packet P1 and a third packet P2 are similarly transmitted on the second data channel and the third data channel. With respect to the second packet P1, FIG. 1 illustrates the instance where the second packet P1 is acknowledged after transmission of the second sub-packet P11. Accordingly, in the subsequent frame, the second data channel carries the first sub-packet P04 of the next, fourth, packet P4. In this example embodiment, in accordance with the 1xEV-DO standard, a maximum of four sub-packet transmissions are permitted. However, it will be appreciated that other maximum values may be selected without departing from the present invention.

Because of the HARQ operation, the transmission of some packets will terminate earlier than others. In the example where there are a maximum of 4 total transmission permitted, there are five possible results for a HARQ operation: packet successfully received after the first sub-packet transmission, packet successfully received after the second sub-packet transmission, packet successfully received after the third sub-packet transmission, packet successfully received after the fourth sub-packet transmission, or the packet could not be successfully decoded at the receiver. The probability of each possible result depends on the transmission power of each respective sub-packet.

Figure 2:
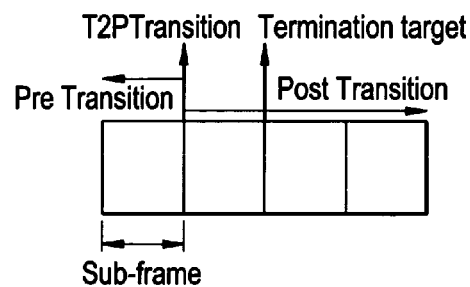
FIG. 2 illustrates the parameters specifying the traffic-to-pilot transmission power gain in 1xEV-DO.

In 1xEV-DO, the T2P value (indicative of the power at which the sub-packet is transmitted) for each sub-packet transmission is specified by four parameters as shown in FIG. 2. Those four parameters are: T2PTransition, PreTransition, Post Transition, and Termination Target. The 1xEV-DO standard provides for two T2P values per packet. The T2PTransition parameter specifies when the T2P value is to change from one of the two T2P values to the other. For example, the transition point indicated by the T2PTransition parameter may be after the second sub-packet transmission. The PreTransition parameter specifies the TMP value before the transition point, and the Post Transition parameter specifies the T2P value after the transition point. The Termination Target parameter indicates the number of sub-packet transmissions at which the packet error rate should meet a target packet error rate (e.g., 1%).

For example, the packet termination behavior may be aggressively set by using a larger T2P value (e.g., 10 dB) at the first and second sub-packet transmissions and a smaller T2P value (e.g., 3.75 dB) for the remaining third and fourth sub-packet transmissions. This results in most of the packet transmissions terminating with one of the first two sub-packet transmissions. As a result, the amount of time between the initial sub-packet transmission and acknowledgment of the packet transmission by a receiver—referred to as the transmission delay—is relatively short. Alternatively, a less aggressive termination behavior may be set by setting all sub-packet transmissions to the smaller T2P value (e.g., 3.75 dB). Here, most of the packet transmissions will terminate after the second or third sub-packet transmission. As a result, the transmission delay will be longer than in the aggressive example given above.

According to example embodiments of the present invention, the transmission delay may be controlled by setting the T2P values for each sub-packet transmission such that packet transmission terminates at a desired transmission delay. By managing the T2P values, transmission delay may be managed to provide different levels of Quality of Service (QoS) and/or to meet QoS requirements. As may be appreciated, a downside to shortening the transmission delay is a larger average received power per packet.

Figure 3:
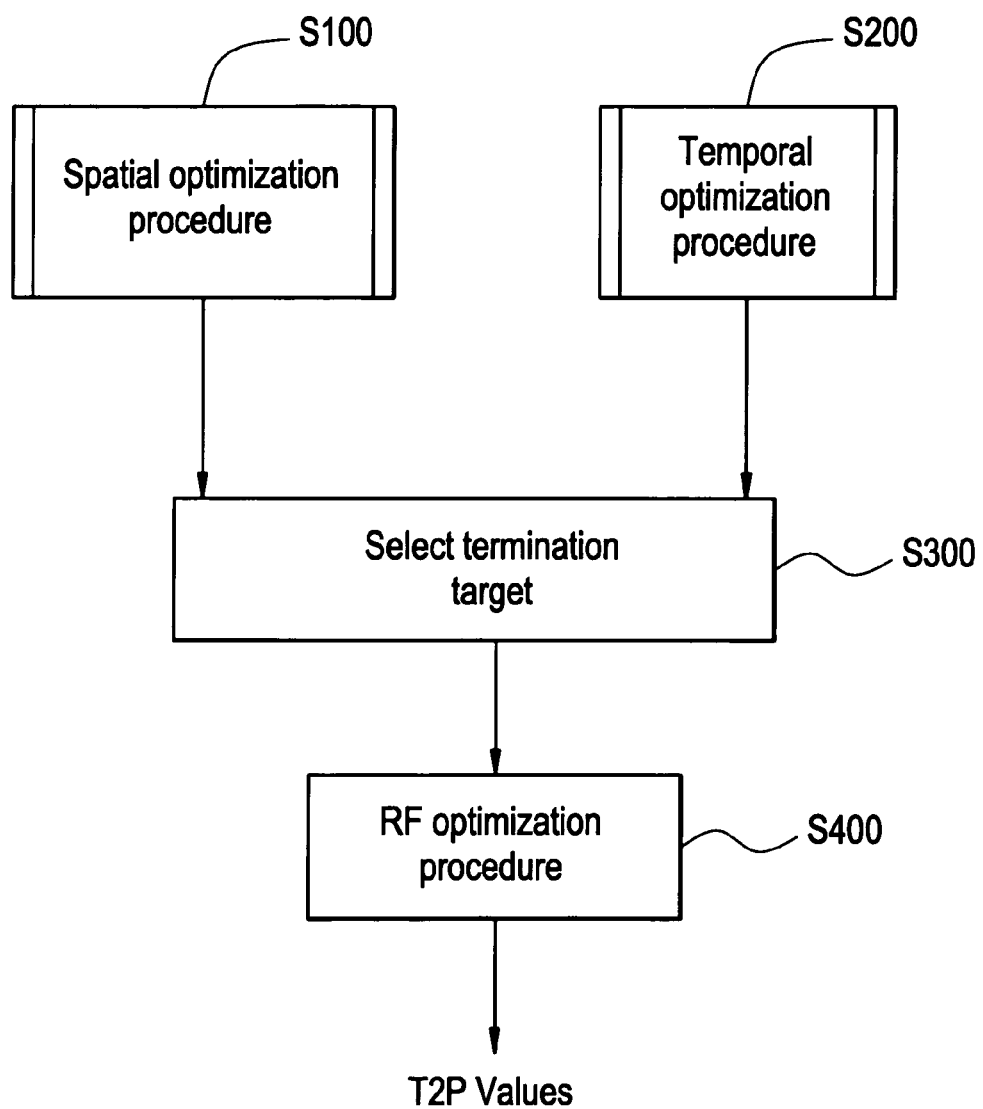
FIG. 3 illustrates a method of managing transmission delay according to an example embodiment of the present invention.

FIG. 3 illustrates a flow chart of a method for managing the T2P values, and therefore, the transmission delay according to an embodiment of the present invention. As will be appreciated, this method may be implemented by appropriate software and/or firmware loaded into a mobile station. As shown in FIG. 3, in step S10, the mobile station performs a spatial optimization procedure to obtain a spatial termination target value. An example embodiment of this spatial optimization procedure is illustrated in FIG. 4.

Figure 4:
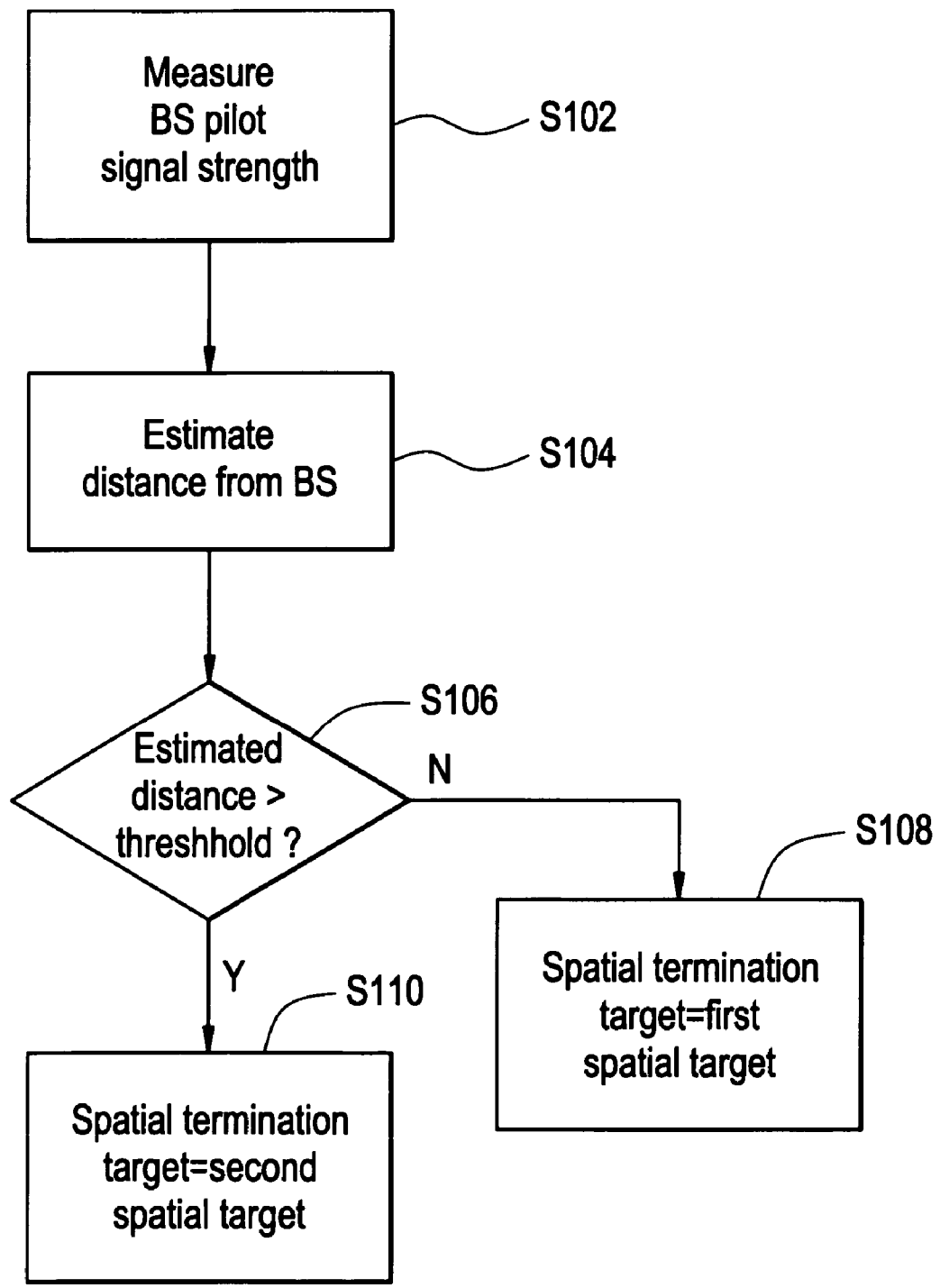
FIG. 4 illustrates a spatial optimization procedure according to an example embodiment of the present invention.

As shown in FIG. 4, in step S102, the mobile station measures the base station's pilot signal strength. Using the measured pilot signal strength, the mobile station estimates its distance from the base station. As is known:

$$Rx\_power\_at\_MS = Tx\_power\_from\_BS * propagation\_loss \quad (1)$$

where Rx_power_at_MS is the base station's pilot signal strength measured by the mobile station, Tx_power_from_BS is the signal strength of the pilot signal as transmitted by the base station (as is known, the mobile station may obtain this value from an overhead channel transmitted by the base station). The propagation loss may be expressed as:

$$propagation\_loss = constant * distance^{\wedge}(-pathloss\_exp) \quad (2)$$

where the pathloss_exp and constant are design parameters set accordance with any well-known propagation model, and distance is the distance between the mobile station and the base station.

Using expressions (1) and (2), the mobile station solves for the distance to generate an estimate of the distance between the mobile station and the base station. In step S106 of FIG. 4, the mobile station compares the estimated distance to a distance threshold. If less than or equal to the threshold, the spatial termination target for when the packet transmission terminates due to successful transmission is set to a first spatial termination target. However, if the estimated distance is greater than the distance threshold, the spatial termination target is set to a second spatial termination target. As mobiles with shorter delay will require more average transmitted power, a mobile at a cell edge may be assigned a longer transmission delay, which will result in less transmit power, and reduce its interference to other cells and improve overall system capacity. Accordingly, the second spatial termination target is set higher than the first spatial termination target. In the example of 1xEV-DO, the first spatial termination target may be the second sub-packet transmission and the second spatial termination target may be the third sub-packet transmission.

While the example optimization procedure has been described for an instance that separates a cell into two geographic regions using a single distance threshold, and therefore, results in a choice between two possible target terminations, the present invention is not limited to this example. Instead, by using more than one distance threshold, the cell may be divided into more than two geographic regions, each with its own respective target termination.

Figure 5:
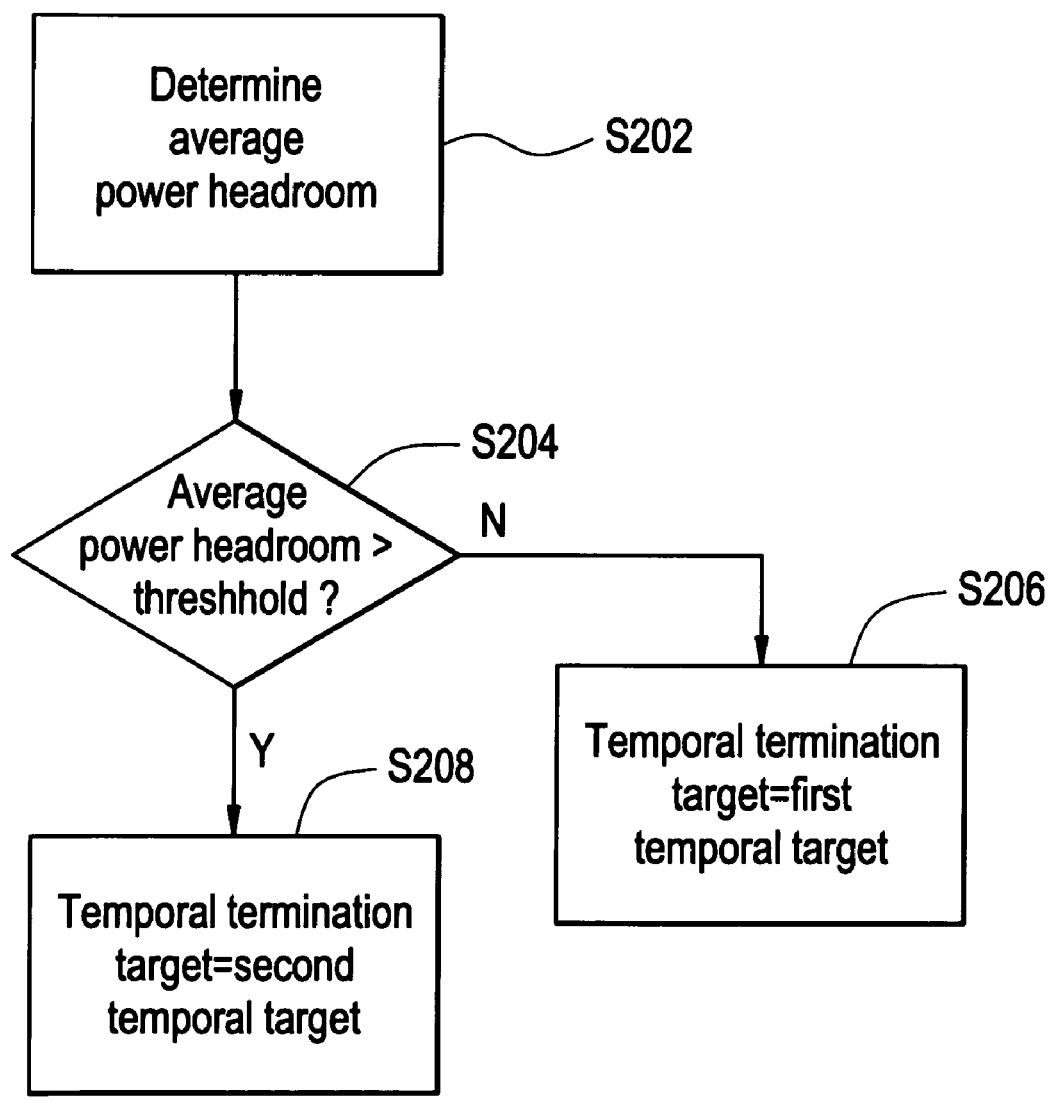
FIG. 5 illustrates a temporal optimization procedure according to an example embodiment of the present invention.

Returning to FIG. 3, in addition to the spatial optimization procedure in step S100, the mobile station may perform a temporal optimization procedure in step S200. FIG. 5 illustrates an example of a temporal optimization procedure. As shown, in step S202 the mobile station determines an average power headroom. As is known, a mobile station may have a maximum transmission power, but often transmits at a power below the maximum. The unused power or the difference between the maximum transmission power and the power actually used for transmission may be referred to as the power headroom. Accordingly, in step S202 the mobile station monitors the mobile's amplifier power headroom over time, and obtains an average thereof. For instance, the mobile may obtain an average over a moving time window.

In step S204, the mobile compares the average power headroom to a threshold power headroom. If the average power headroom is less than or equal to the threshold power headroom, the temporal termination target is set to a a first temporal termination target. However, if the average power headroom is greater than the threshold power headroom, the temporal termination target is set to a second temporal termination target. In this example, embodiment, the second temporal termination target is less than the first temporal termination target. In the example of 1xEV-DO, the first temporal termination target may be the third sub-packet transmission, and the second temporal termination target may be the second sub-packet transmission.

When the mobile experiences shadow fading, it is expected that the mobile will need to transmit more power to overcome the signal strength degradation and this leaves smaller power headroom available. Accordingly, the average power headroom is reflective of the temporal fading characteristics of the mobile station. Therefore, when the mobile's power headroom is less than the power headroom threshold, the system may assign the termination target to be a larger value.

While the example optimization procedure has been described for an instance that separates headroom into being reflective of two temporal fading characteristics using a single distance threshold, and therefore, results in a choice between two possible target terminations, the present invention is not limited to this example. Instead, by using more than one threshold, the headroom may be divided into more than two fading characteristics, each with its own respective target termination.

Returning to FIG. 3, in step S300, the mobile station selects one of the spatial termination target and the temporal termination target as the termination target. For example, in one embodiment, the maximum one of the spatial termination target and the temporal termination target is selected as the termination target. Next, in step S400 an RF optimization procedure is performed. More specifically, in the RF optimization procedure, the mobile establishes T2P power settings according to the termination target and based on the mobile's RF channel condition. For example, the mobile obtains a Doppler frequency estimate based on the fading characteristics of the base station pilot signal power according to any well-known manner.

Based on the Doppler frequency estimate, the mobile characterizes the base station pilot signal channel, and treats this characterization as representative of the RF characterization of the uplink or reverse link traffic channel. For example, the base station pilot signal channel, and therefore the traffic channel, may be characterized as AWGN (additive white Guassian noise), 3 kmph, 30 kmph, 60 kmph, 120 kmph, etc. Again characterizing a channel based on the Doppler frequency is well-known in the art and any such well-known characterization algorithm may be used. For each characterization, the mobile station stores a set of T2P profiles. Each T2P profile member in the set of T2P profiles is associated with a different possible termination target. For example, the 1xEV-DO standard allows a mobile to include two T2P profile members: one associated with a shorter termination target (e.g., called low latency mode), and the other associated with a longer termination target (e.g., called high capacity mode). For 1xEV-DO, each T2P profile member may include the T2P values for the first, second, third and fourth sub-packet transmissions.

For example, for a termination target of the third sub-packet in 1xEV-DO, the T2P values for the first-fourth sub-packet transmission may be 6.0, 6.0, 6.0 and 3.75 dB, respectively if the channel is characterized as AWGN; and the T2P values for the first-fourth sub-packet transmission may be 6.5, 6.5, 6.5 and 3.75 dB, respectively if the channel is characterized as 3 kmph. For a termination target of the second sub-packet in 1xEV-DO, the T2P values for the first-fourth sub-packet transmission may be 9.0, 9.0, 3.75 and 3.75 dB, respectively if the channel is characterized as AWGN; and the T2P values for the first-fourth sub-packet transmission may be 10, 10, 3.75 and 3.75 dB, respectively if the channel is characterized as 3 kmph.

In alternative embodiments, the T2P values may be established based on less than all of the spatial, temporal and RF optimization procedures, and/or based on only one of the spatial, temporal and RF optimization procedures. For example, in an embodiment where the temporal optimization procedure is not employed, step S300 of FIG. 3 may be fed a default spatial termination target, or step S300 may output the temporal termination target as the termination target. Similarly, in an embodiment where the temporal optimization procedure is not employed, step S300 of FIG. 3 may be fed a default temporal termination target, or step S300 may output the spatial temporal termination target as the termination target.

If the RF optimization procedure is not employed, then a default set of T2P profiles are used. Each member in the default set of T2P profiles corresponds to a different one of the possible termination targets.

By managing the T2P values based on one or more of the spatial considerations, temporal considerations and RF channel consideration, example embodiments of the present invention more effectively manage transmission delay. As such, the present invention provides for improved resource management and quality of service.

The invention being thus described, it will be obvious that the same may be varied in many ways. For example, while an example implementation of the present invention has been described with respect to a CDMA system, it will be appreciated that the present invention is applicable to other standards based systems. Such variations are not to be regarded as a departure from the invention, and all such modifications are intended to be included within the scope of the invention.

We claim:

1. A method of managing transmission delay in a wireless communication system, comprising:
controlling, by a network element, a length of time over which a mobile station re-transmits a packet or portion of a packet that has not been received over a channel, the re-transmission being accomplished to support Hybrid Automatic Repeat Request (HARQ) packet transmission, such that the length of time depends on a transmission power and at least one of a position of the mobile station, a temporal fading characteristic of the mobile station, and a radio frequency characteristic of the channel,
wherein the controlling step alters the length of time over which the mobile station re-transmits the packet or the portion of the packet by controlling transmission powers with which sub-packets associated with the packet are transmitted.

2. The method of claim 1, wherein the controlling step controls a desired number of sub-packet transmissions associated with a packet before receipt of the packet is acknowledged.

3. The method of claim 2, wherein the controlling step controls powers of the sub-packet transmissions.

4. The method of claim 1, wherein the controlling step controls the transmission powers of the sub-packets based on a distance the mobile station is from a base station handling communication for the mobile station.

5. The method of claim 4, wherein the controlling step reduces at least one of the transmission powers as the distance increases beyond a threshold distance.

6. The method of claim 1, wherein the controlling step reduces an average of the transmission powers for the sub-packets if a distance between the mobile station and a base station, which handles communication for the mobile station, increases beyond a threshold distance.

7. The method of claim 1, wherein the controlling step dynamically controls the transmission powers for the sub-packets based on the temporal fading characteristic of the mobile station.

8. The method of claim 1, wherein the controlling step reduces at least one of the transmission powers for the sub-packets if the mobile station is experiencing fading greater than a threshold amount.

9. The method of claim 1, wherein the controlling step determines an average transmission power headroom for transmission on the channel as being indicative of the temporal fading characteristic, and controls the transmission powers based on the determined average transmission power headroom.

10. The method of claim 9, wherein the controlling step reduces at least one of the transmission powers if the determined average transmission power headroom falls below a threshold value.

11. The method of claim 1, wherein the controlling step controls at least one of the transmission powers based on a Doppler frequency of the channel.

12. The method of claim 11, wherein the controlling step determines a Doppler frequency of a pilot signal received from a base station, and uses the determined Doppler frequency as the Doppler frequency of the channel.

13. The method of claim 1, wherein the controlling step controls the length of time based on the position of the mobile station and the temporal fading characteristic.

14. The method of claim 1, wherein the controlling step controls the length of time based on the position of the mobile station and the RF channel characteristic.

15. The method of claim 1, wherein the controlling step controls the length of time based on the temporal fading characteristic and the RF channel characteristic.

16. The method of claim 1, wherein the controlling step controls the length of time based on the position of the mobile station, the temporal fading characteristic and the RF channel characteristic.

17. The method of claim 1, wherein a total number of permitted re-transmissions of the packet or the portion of the packet are capped by a maximum number of permitted re-transmissions, and held constant during the method.

18. A method of managing transmission delay in a wireless communication system of the kind in which HARQ techniques are available for packet transmission, such that a packet may be transmitted over a reverse link as a single sub-packet or, with retransmission, as a sequence of two or more sub-packets, comprising:
   determining, by a network element, at least one metric from the set consisting of a position of the mobile station, a temporal fading characteristic of the mobile station, and a radio frequency characteristic of the channel;
   determining, by the network element, a statistical number of retransmissions before receipt of the sub-packet is expected to be acknowledged; and
   controlling, by the network element, the statistical number of retransmissions by adjusting transmission power levels for the sub-packets, in one or more of said sequences, based on the at least one metric and on a known relationship between sub-packet power levels and packet error rates.

19. The method of claim 18, wherein a total number of permitted re-transmissions of the sub-packets are capped by a maximum number of permitted re-transmissions, and held constant during the method.

* * * * *